2 Sheets--Sheet 2.
W. S. HOUGH.
Bee-Hives.
No. 144,847. Patented Nov. 25, 1873.
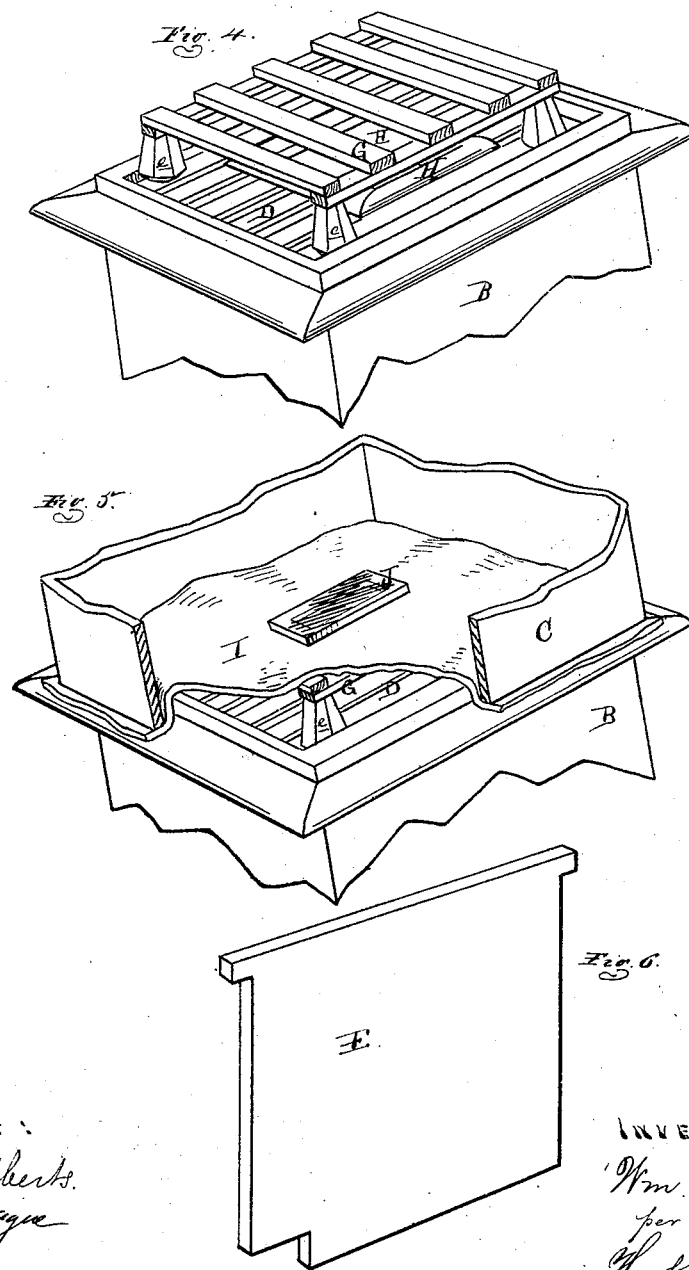

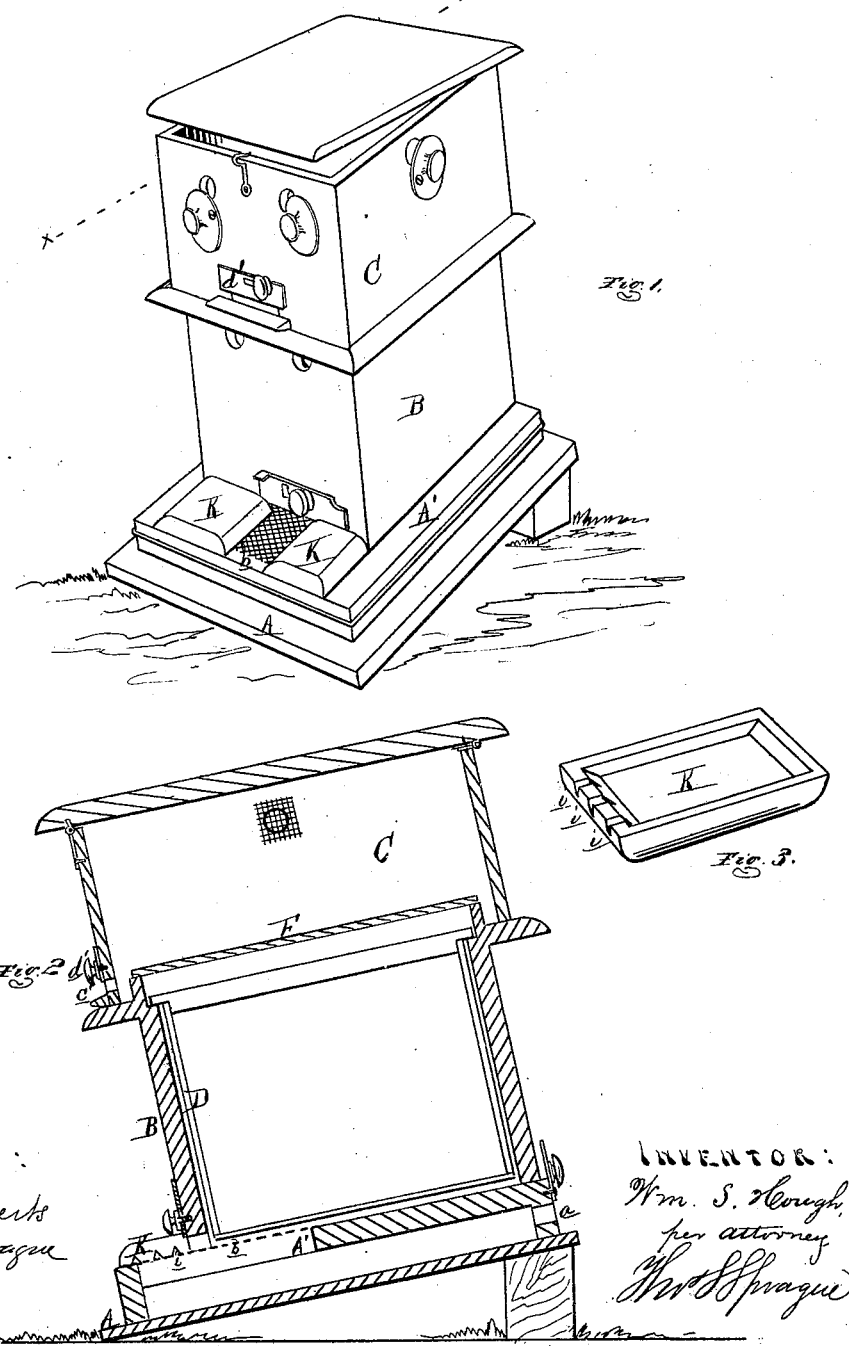

UNITED STATES PATENT OFFICE.

WILLIAM S. HOUGH, OF GALT, ASSIGNOR TO HIMSELF AND SILVANUS CORNELL, OF WIDDER STATION, CANADA.

IMPROVEMENT IN BEE-HIVES.

Specification forming part of Letters Patent No. 144,847, dated November 25, 1873; application filed April 24, 1873.

*To all whom it may concern:*

Be it known that I, WILLIAM S. HOUGH, of Galt, in the county of Waterloo and Province of Ontario, Canada, have invented a new and useful Improvement in Bee-Hives; and I do declare that the following is a true and accurate description thereof, reference being had to the accompanying drawings and to the letters of reference marked thereon and being a part of this specification, in which—

Figure 1, Sheet 1, is a perspective view of the hive as arranged for summer-work. Fig. 2 is a vertical section of the same on the line $x\ x$ in Fig. 1. Fig. 3 is a bottom perspective view of one of the moth-traps. Fig. 4, Sheet 2, is a perspective view of the top of the brood-chamber, with the elevated rack and feeding-board placed on the comb-frames, for winter-keeping. Fig. 5 is a similar view of the same with the covering-cloth laid thereon. Fig. 6 is a perspective view of the brood-board.

Like letters refer to like parts in the several figures.

This invention consists in the arrangement of the entrance-opening and the adjacent parts, and the construction of a peculiar moth-trap, as will be fully described hereinafter.

In the drawing, A represents a plain bottom board, which should be inclined toward the front of the hive by a block under its back edge. On this is laid a honey-board, A′, with a pendent flange around its edges, so as to leave a space between the boards, to which access is had through an opening, $a$, at the back end, which can be closed by a cover. In the fore part of the honey-board is a large opening, closed by a wire-cloth screen, $b$. B is a brood-chamber, which rests on the honey-board and is open at top and bottom, surmounted by a cap, C, whose top is a hinged lid. The fore part of the wire-cloth grating forms an alighting-board for the bees, which enter the chamber B through a slot, $c$. The cap is also provided with an entrance, $c'$. Both entrances are provided with adjustable or regulator slides $d\ d'$. D are comb-frames, suspended from ledges longitudinally in the brood-chamber—usually seven in number. E is a movable partition or brood-board, which is suspended from the ledges of the brood-chamber in such a manner as to divide it into two compartments, the purpose of which is that when the stock is divided or weak it may be used to contract the area of the working-space to one, two, or more frames. In this manner the actual working-space is kept warm, and fewer bees are required to remain in the hive to cover the young bees and protect the hive from robbers, thus giving a greater percentage of workers to gather honey, the progress being inspected through a glass cover, F, laid on top of the frames, within the top edges of the brood-chamber, in the cap. The ordinary boxes may be placed—or preferably frames—to receive the surplus honey, the bees working it through the upper entrance.

In arranging the hive for winter-quarters, the cap and glass cover F are removed from the brood-chamber, and a rack, G, is placed over the frames, being supported at each corner by the legs $e$, which rest on the ends of the outer frames about an inch above them. Under this rack a feeding-board, H, may be placed, if necessary, to feed the bees during the winter on top of the frames. Over the rack is then laid a thick woolen cloth, I, extending to the edges of the brood-chamber, with a rectangular hole in its middle, over which is laid a piece of glass, J. The cap is then replaced over the brood-chamber, which may then be placed in an inclosing-box, or wrapped with straw, to prevent the freezing of the bees.

During cold weather the bees collect about the tops of the combs and manifest an indisposition or inability to descend to the bottoms of the frames, after exhausting the honey, and passing under them to intact combs; consequently, many of them die from starvation. By using this rack they are free to pass over the tops of the frames from one comb to another, while the cloth not only protects them from cold from above, but also absorbs the moisture of their exhalation, and thus diminishes their tendency to diseases arising from dampness. Through the glazed opening in the cloth the condition of the stock may be examined from time to time, and, if food is needed, it may be placed in the feed-board.

K is a moth-trap, placed on the alighting-board at each side of the principal entrance. These are simple blocks of wood, with a recess on the under side, to which access is had through several small passages, $i$, cut in the inner end, which the moth readily enters and passes into the recess to deposit her larvæ, whence they are removed and destroyed, as occasion may require.

When robber-bees approach the hive, finding the main entrance guarded, in their investigations they discover the entrance $a$ at the back of the hive, and, being attracted by the light in front, pass in under the honey-board, and are not likely to find the same exit, it being darker than the fore part; consequently they die under the honey-board. The grating $b$ also serves as a ventilator to the hive, allowing the air to flow up into the hive, without subjecting the young bees to a strong direct draft, to their great detriment.

What I claim as my invention, and desire to secure by Letters Patent, is—

1. The flanged honey-board A', the entrance $a$, and the grating $b$, arranged above the bottom board A, substantially as described.

2. The moth-trap K, recessed on its under side and provided with the passages $i$, arranged and operating as described.

WILLIAM S. HOUGH.

Witnesses:
H. F. EBERTS,
H. S. SPRAGUE.